United States Patent [19]

Smith

[11] 4,102,728

[45] Jul. 25, 1978

[54] LABEL APPLYING APPARATUS

[75] Inventor: Donald C. Smith, Melrose Park, Ill.

[73] Assignee: Sterling Associates, Inc., Westmont, Ill.

[21] Appl. No.: 798,652

[22] Filed: May 19, 1977

[51] Int. Cl.[2] .............................................. B32B 31/00

[52] U.S. Cl. ................................ 156/362; 53/198 R; 53/291; 53/297; 156/443; 156/510

[58] Field of Search ................. 53/30 S, 139.3, 184 S, 53/198 R, 291, 292, 295–298, 241, 256; 156/362, 423, 86, 213, 252, 257, 443, 510; 225/100, 101, 105

[56] References Cited

U.S. PATENT DOCUMENTS

| | | | |
|---|---|---|---|
| 3,308,601 | 3/1967 | Masters | 53/256 |
| 3,551,258 | 12/1970 | Galvanoni | 53/291 X |
| 3,792,807 | 2/1974 | Mare | 225/100 |
| 3,895,480 | 7/1975 | Lombardo | 53/256 |
| 3,961,460 | 6/1976 | Jelling et al. | 53/241 X |
| 3,974,628 | 8/1976 | Konstantin | 53/297 X |
| 4,027,461 | 6/1977 | Jelling et al. | 53/241 |

*Primary Examiner*—David A. Simmons
*Attorney, Agent, or Firm*—McCaleb, Lucas & Brugman

[57] ABSTRACT

Apparatus for applying preprinted tubular labels or bands about the exterior of non-rigid walled containers is disclosed; the labels being made of flexible plastic and supplied from an elongated tube in a collapsed or flattened state stored in a roll supply thereof. The apparatus includes means for automatically positioning individual unlabeled containers at a labeling station and for removing labeled containers therefrom. First gripper means are provided for advancing one end of the label supply over a guide horn for opening a leading label to the general transverse configuration of the container, and for cooperation with second gripper means in detaching individual opened labels from the supply roll while advancing the opened label over the container's exterior and releasing the same at a desired location thereabout.

10 Claims, 15 Drawing Figures

Fig. 11
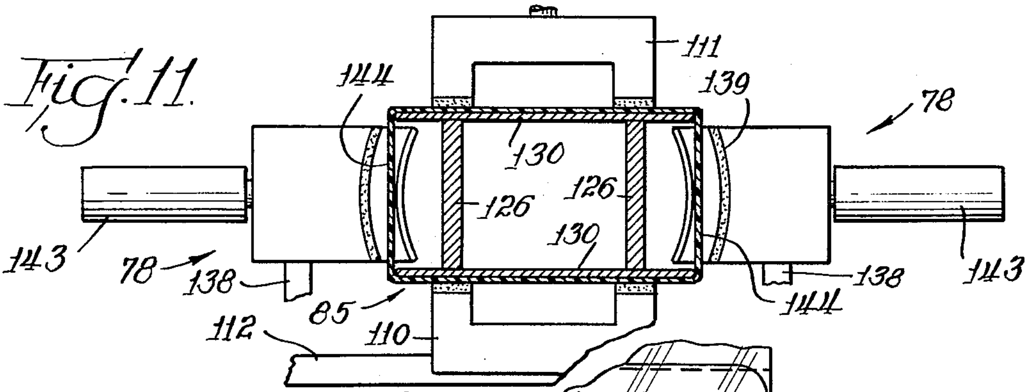
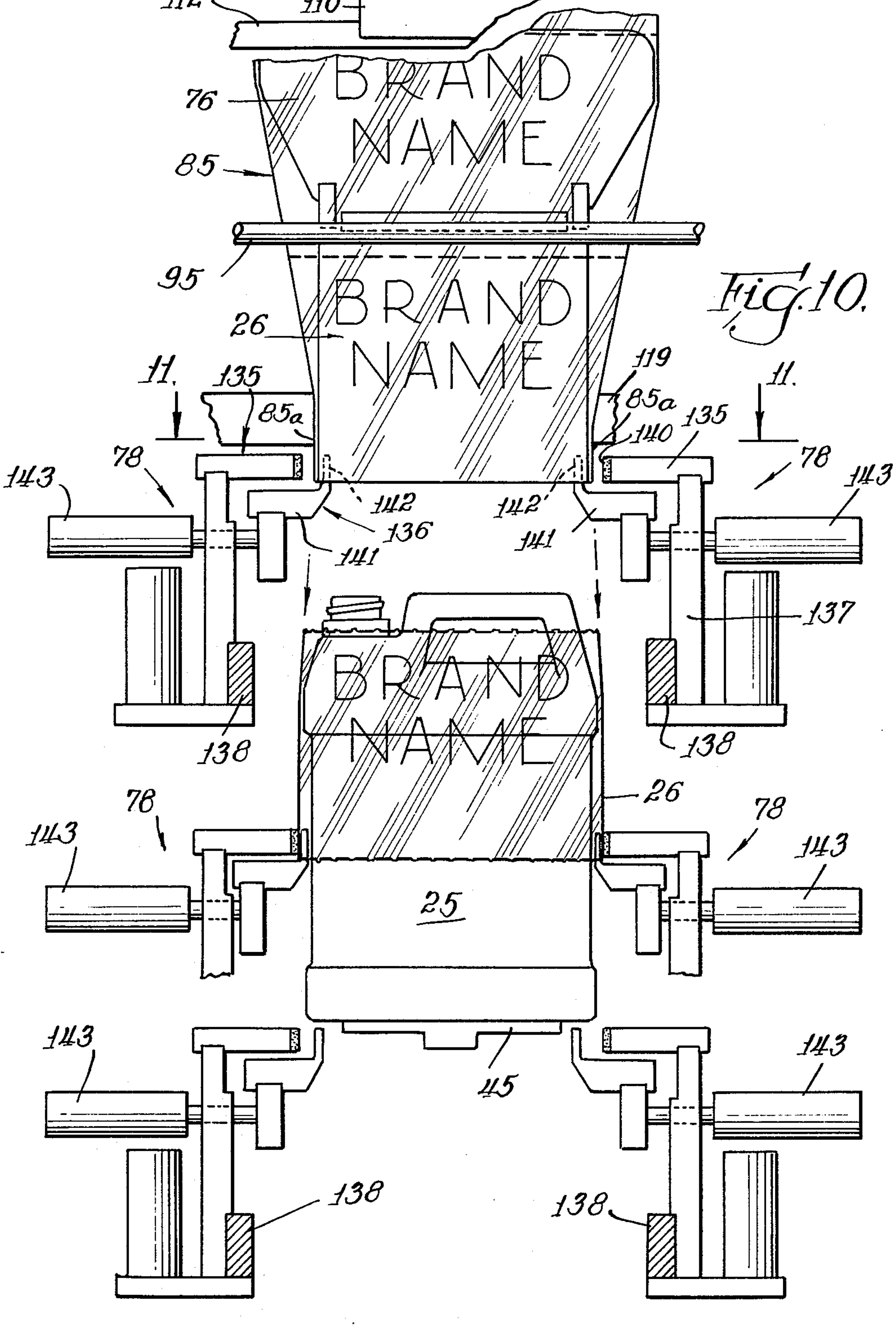
Fig. 10

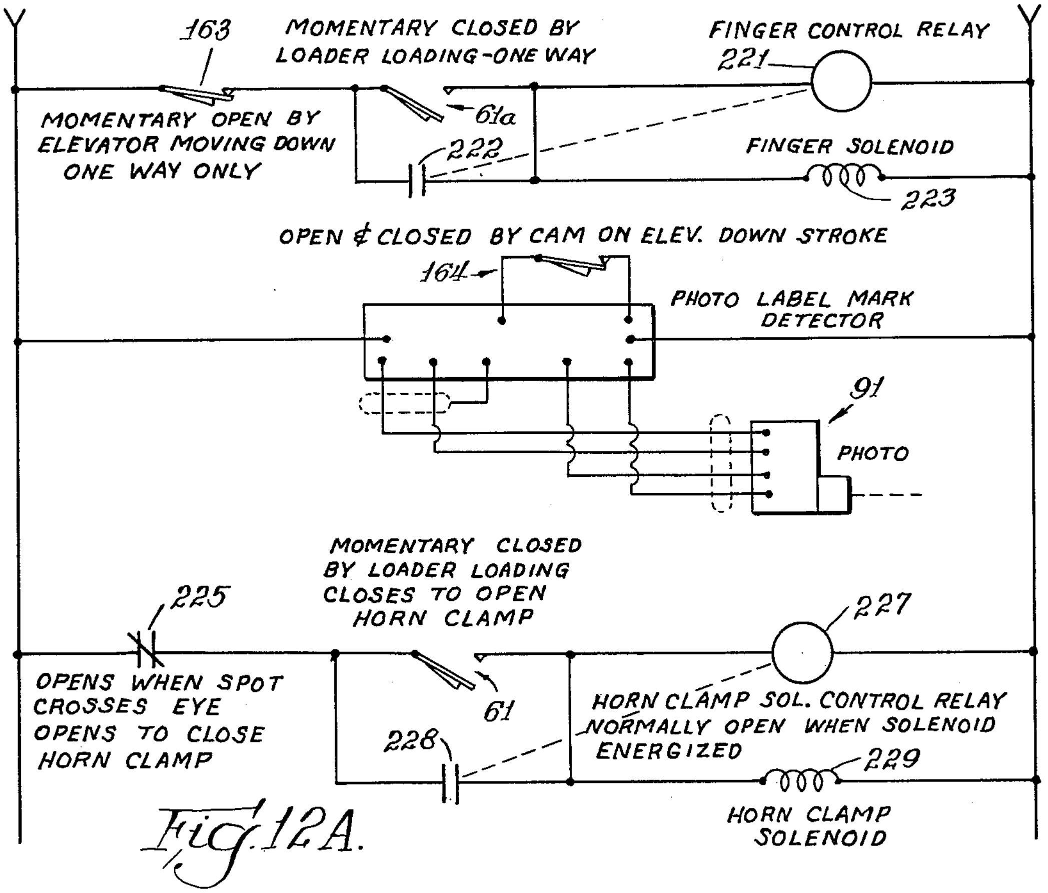
Fig. 12A.
Fig. 13.
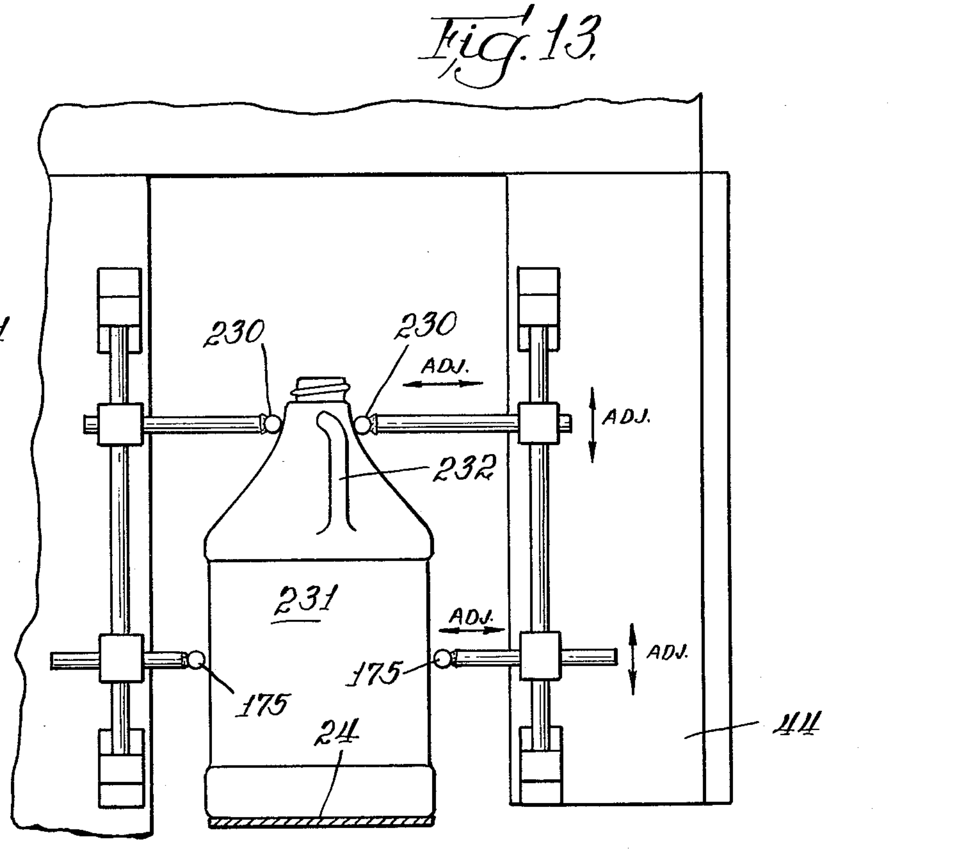
Fig. 14.
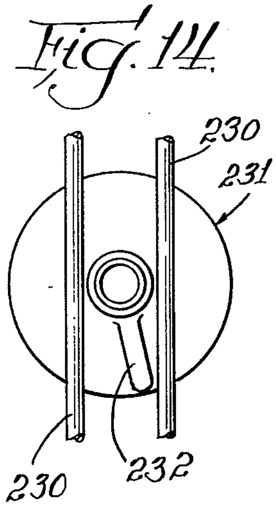

LABEL APPLYING APPARATUS

BACKGROUND OF THE INVENTION

Under modern packaging practice, molded flexible walled plastic containers are widely used for packaging a variety of products, particularly liquids such as water, cleaning agents, anti-freeze and the like.

When such containers were first introduced they were commonly labeled by silk screen printing techniques. However, that procedure has limited applicability due to inherent high cost, limitations on multi-color applications, and the necessity for warehousing or storing preprinted containers in order to provide an adequate inventory and thus inherently relegating the unfilled preprinted containers to specific product usage.

More recently, preprinted plastic labels, formed as endless tubular bands, have gained popular acceptance due to low cost, compactness for storage, and their ready adaptation to relatively low-cost offset or similar printing processes. With the advent of such preprinted tubular labels, it is no longer necessary to store or warehouse preprinted containers since a supply of blank containers may be readily adapted to a variety of products simply by applying the appropriate band label thereto. Normally such band labels are formed from thin flexible plastic film having the opposing ends thereof heat sealed or bonded to form an endless band. Preferably a multiplicity of such tubular band labels are formed end-to-end from an elongated tube which is then printed and stored in a collapsed state, usually in a roll form, with the individual label bands being delineated by perforations or other parting means so that they may be removed one by one from the leading end of the storage roll.

In the early use of such band labels, the same were applied by hand, fitting them over the exterior of the containers, frequently stretching tight fitting labels or gluing loose fitting labels to hold the same in a desired display position. With the advent of heat shrink plastic films for band labels, heat shrinking techniques were readily adapted for anchoring the labels in place about rigid walled, as well as flexible walled, containers.

Since the hand application of the band labels is time consuming and costly, devices for assisting and accelerating the label application techniques were developed, as typified in U.S. Pat. Nos. 3,811,986 issued May 21, 1974 and 3,850,777 issued Nov. 26, 1974. Certain mechanical devices also were developed for at least semi-automatically opening the label bands and applying the same to the containers. See, for instance, the opening apparatus set out in U.S. Pat. Nos. 3,792,807 issued Feb. 19, 1974 or 3,551,258 issued Dec. 29, 1970 and 3,523,052 of Aug. 4, 1970.

In general, it may be stated that while previously known devices and mechanisms of the prior art have gained commercial acceptance, the need for a fully automated apparatus, capable of positive, fast application of tubular labels in a reliable manner, still exists. It is to that area that the current invention is directed; the same embodying improved operational concepts and mechanisms for the automatic opening and application of tubular labels about containers, particularly flexible walled plastic containers, although the concepts and teachings thereof are readily adaptable to applying band containers, of heat shrinkable plastic for instance, about rigid walled containers as well.

SUMMARY

This invention relates generally to automatic packaging machinery and more particularly to improved apparatus for applying tubular band labels about containers.

In brief, this invention is concerned with mechanical apparatus for automatically orienting and positioning unlabeled containers opposite or at a labeling station and for removing labeled containers therefrom, means for automatically detaching individual tubular sleeves or band labels from an elongated tubular supply thereof in which the individual bands are detachably interjoined in end-end relation by intervening separation means and are stored in a collapsed state, including first gripper means cooperative with guide means for opening the lead end of the tubular supply to the general transverse contour of the container to be labeled, and which gripper means are operable to advance the supply tube over the label opening guide means; and second gripper means for periodically arresting the supply tube while the opened end thereof is moved responsibly with the first gripper means whereby to detachably separate an individual label from the tubular supply, as the first gripper means pulls a label over the exterior of the container and releases the same at desired display position thereabout. Suitable controls are incorporated in the apparatus, including switching devices and associated circuitry responsive to movement of the tubular supply and the positioning and movement of containers to and from the labeling station whereby to effectuate predetermined sequential operation of the aforenoted means of the label applying apparatus.

It is among the important objects of this invention to provide improved apparatus for mechanically applying tubular labels to the exterior of containers.

It is another important object of this invention to provide an improved means for automatically opening collapsed tubes of tandem related flexible band labels whereby the same are conditioned for application to the exterior of a container.

It is still another important object of this invention to provide improved means for automatically advancing, opening, separating and applying individual tubular band labels to the exterior of containers.

It is a further object of this invention to provide improved apparatus for automatically applying preprinted flexible band labels about the exterior of containers including improved means for sequentially positioning individual container in label applying position, severing or detaching an opened band label from an elongated tubular supply thereof and depositing the same about the exterior of the container.

The above and additional objects, features and advantages of this invention will be apparent to those of skill in this art from the following detailed description of preferred and modified embodiments of this invention, illustrated in the accompanying drawings and representing the best mode presently contemplated so as to enable those of skill in this art to make and practice the same.

Figure 1:
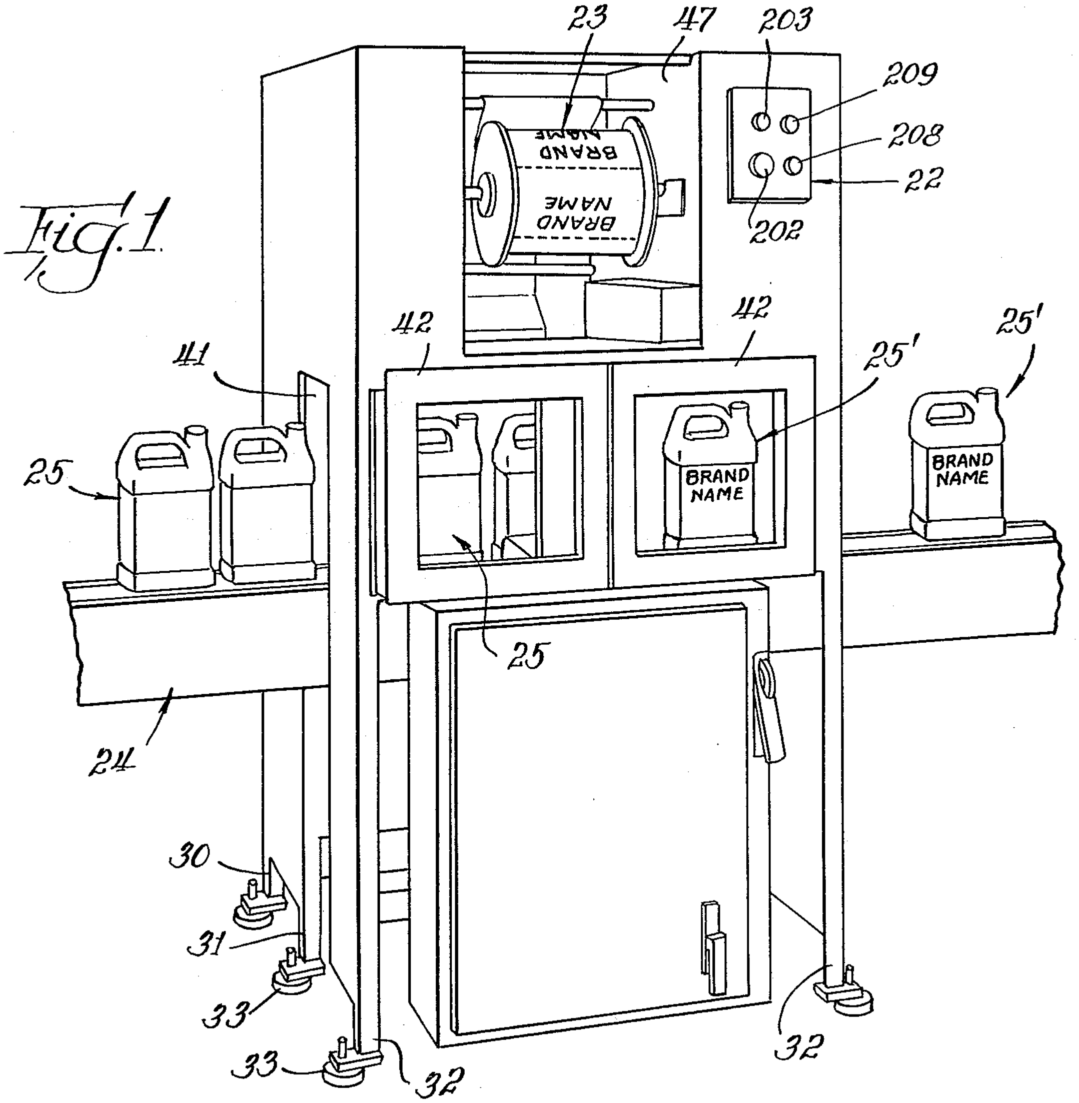
FIG. 1 is a general perspective view of label applying apparatus embodying this invention.
Figure 3:
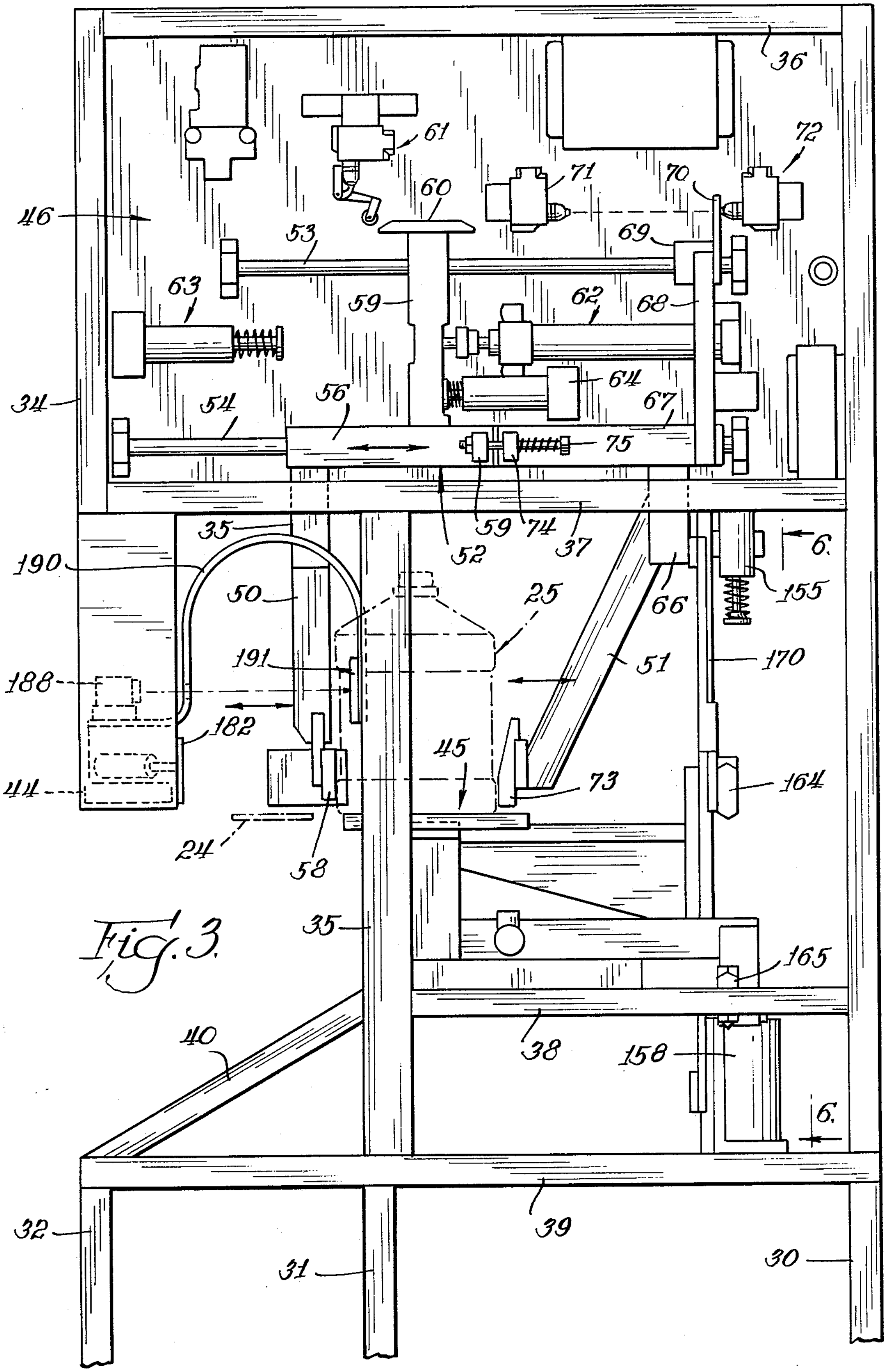
Figure 4:
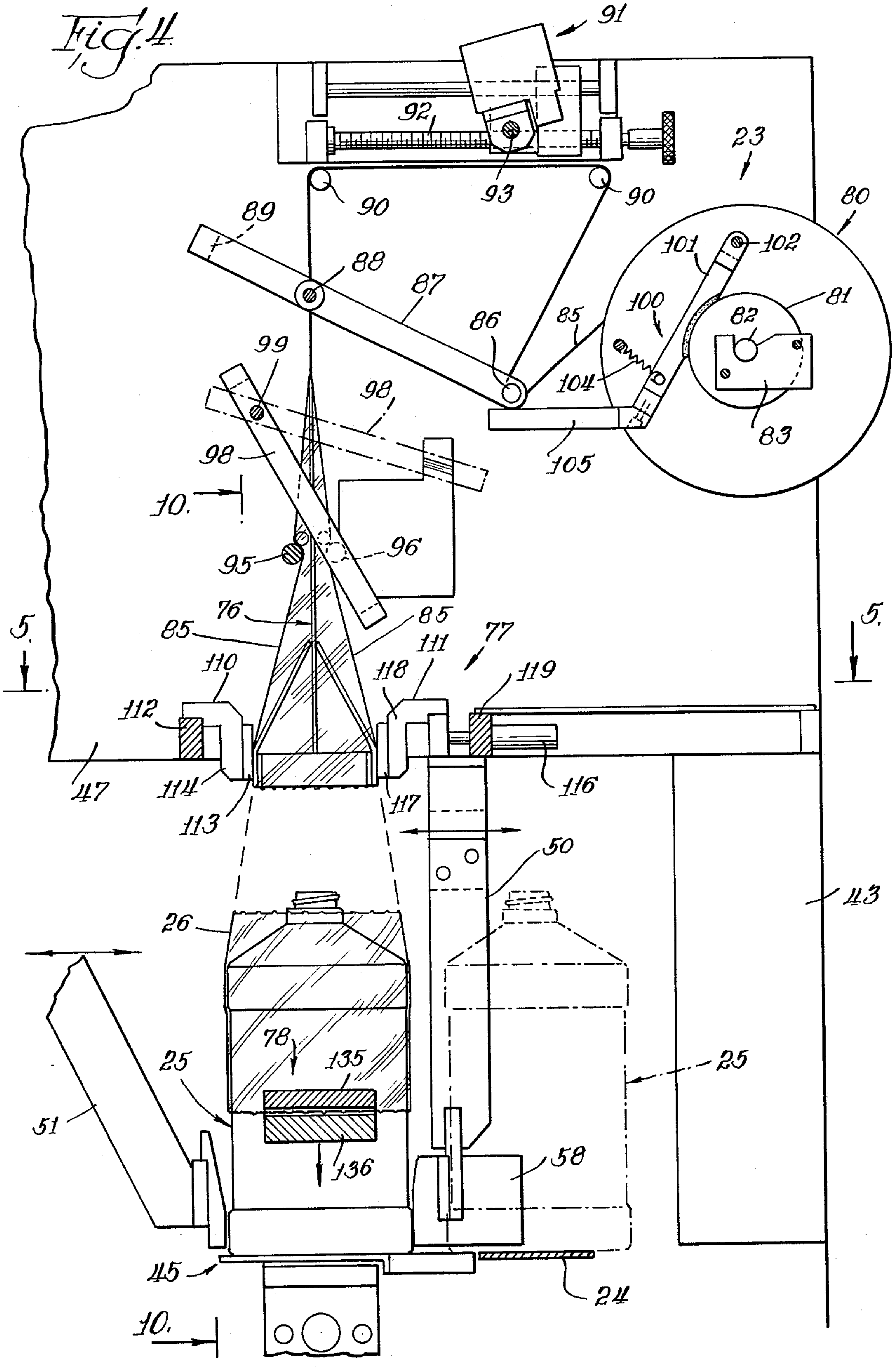
Figure 5:
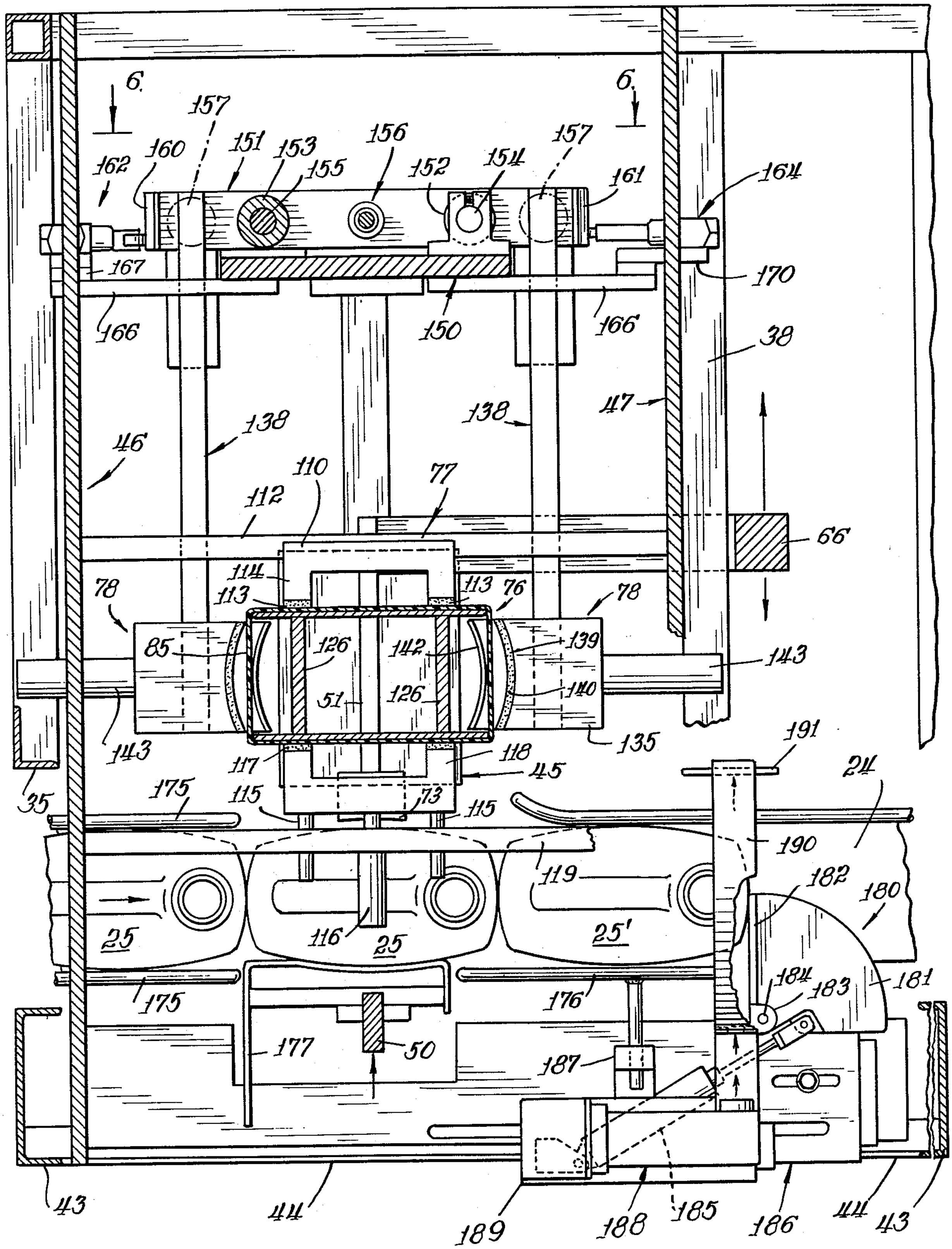
Figure 6:
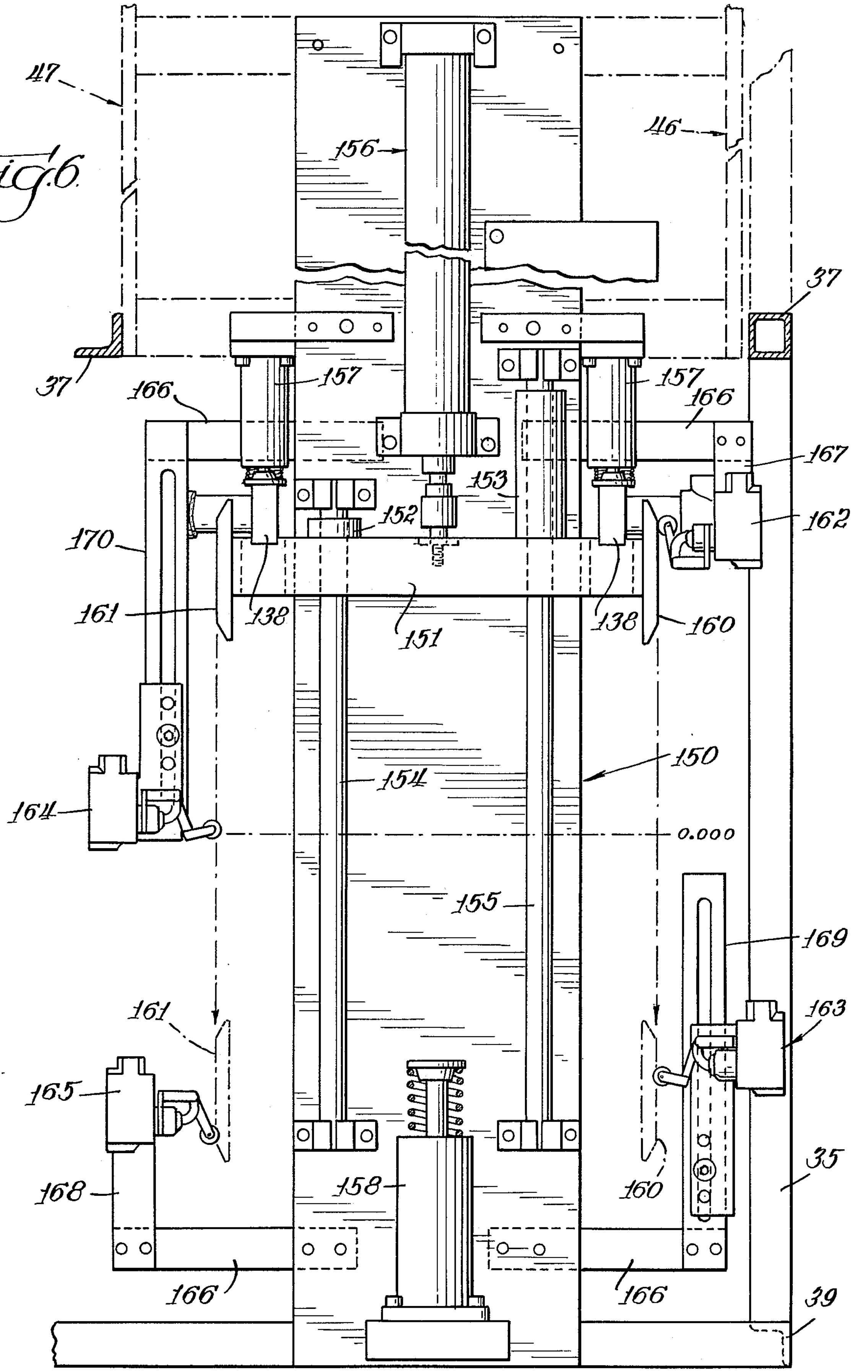
Figure 7:
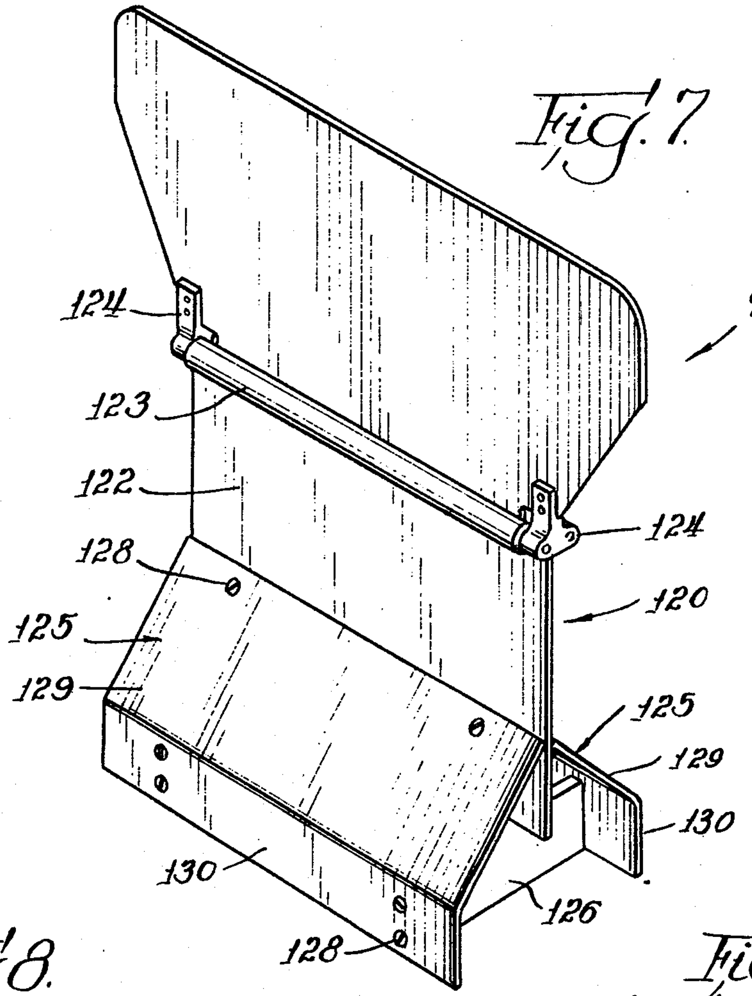
Figure 8:
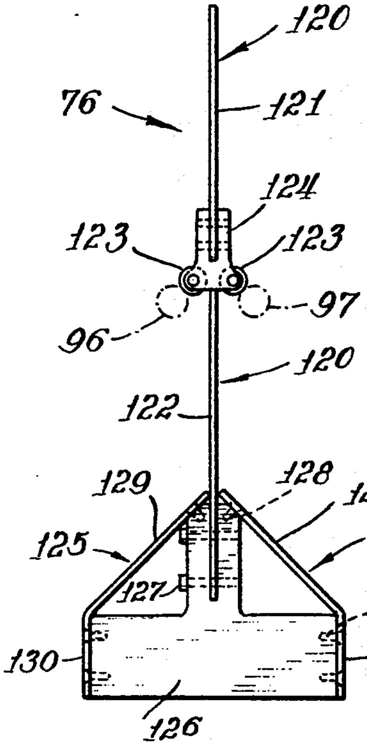
Figure 9:
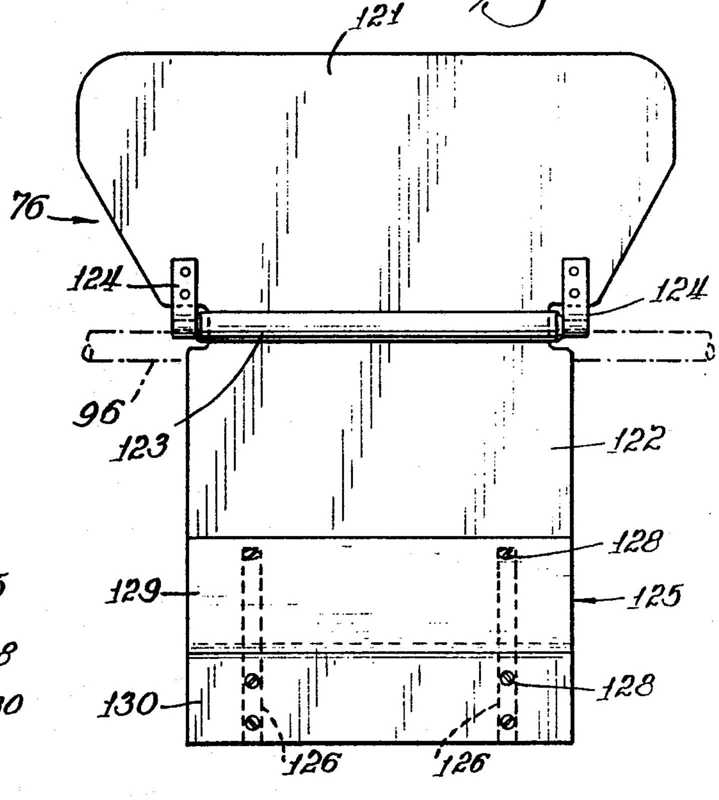
Figure 12:
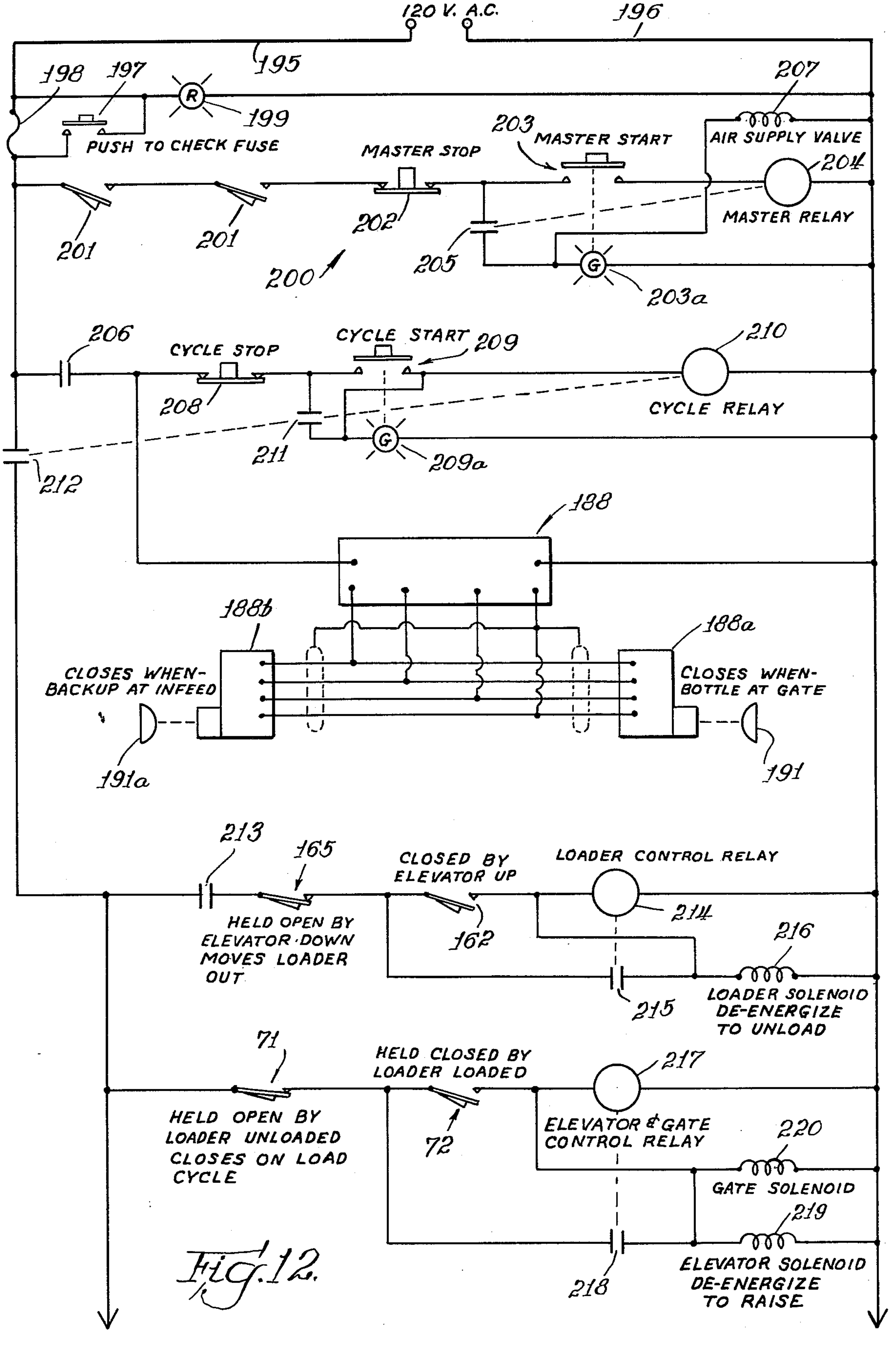

FIG. 3 a partial end elevational view looking at the exit end of the apparatus illustrated in FIG. 1, with outer cover removed, showing basic support framework and means for transferring containers to and from a label applying station thereof;

FIG. 4 is a partial end elevational view similar to FIG. 3, but enlarged thereover and looking at the entrance end of the FIG. 1 apparatus to illustrate the operational relation of means for feeding, opening and applying labels to a container at the labeling station;

FIG. 5 is a top plan view, with portions thereof in section, taken substantially from vantage line 5—5 of FIG. 4 and looking at the direction of the arrows thereon, illustrating the label applying and related apparatus;

FIG. 6 is a cross-sectional view, taken substantially from vantage line 6—6 of FIG. 5 and looking in the direction of the arrows thereon;

FIG. 7 is a perspective view of the label opening means seen in FIG. 4;

FIG. 8 is an end elevational view thereof;

FIG. 9 is a front elevational view thereof;

FIG. 10 is a series of diagrammatic views taken substantially along vantage line 10—10 of FIG. 4, schematically illustrating the sequential operations of opening, detaching and applying a label to a container;

FIG. 11 is a top plan view, with parts in section, of the label opening and applying apparatus illustrated in FIG. 10, taken substantially from vantage line 11—11 of that figure;

FIGS. 12 and 12A are related schematic diagrams of electrical control circuitry involved in the apparatus of this invention;

FIG. 13 is a partial end elevational view showing a modified means for guiding and orienting cylindrical containers; and FIG. 14 is a partial top plan view of the guide means illustrated in FIG. 13.

Figure 2:
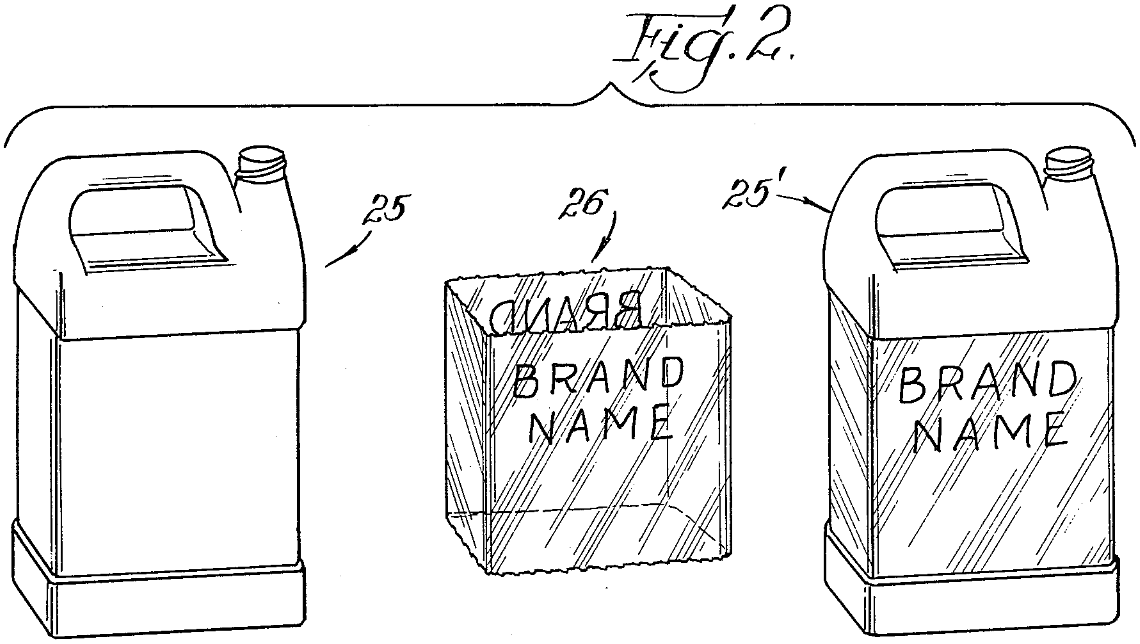
FIG. 2 is a perspective illustration of an unlabeled container, a band label therefor, and a labeled container, as treated by the apparatus of this invention.

Turning now to the particulars of the preferred embodiment illustrated in the accompanying drawings, specific reference is made to FIGS. 1 and 2 wherein the general characteristics and operational objectives of this invention are illustrated.

A labeling machine designated at 20 is illustrated in FIG. 1 as comprising a generally upright machine structure having an exterior housing 21 enclosing appropriate operating mechanisms, and including an operating control panel 22, label supply means 23, and feed and discharge conveyor means 24 for supplying unlabeled bottles or containers 25 to the machine 20 and discharging labeled containers 25' therefrom. Operation of the machine 20 is such as to accommodate an infeed of unlabeled bottles or containers 25 supplied by the user's line conveyor 24. Such unlabeled containers are arrested within the machine opposite a labeling station to which the same are automatically transferred for the application of individual sleeve or band labels 26 (see FIG. 2) detached from a supply web to provide a labeled container 25' which is then repositioned on and carried away from the machine by the conveyor means 24.

It will be understood that the operational accomplishments of the machine 20 are depicted in the schematic illustration of FIG. 2, illustrating an unlabled container 25, typical of the order to be treated in accordance with the current invention; a tubular band label 26 to be applied over the container 25 and the finished product or labeled container 25'. Bearing the above general description in mind, reference is now made to FIGS. 3 and 4 of the drawings respectively illustrating means for transferring containers between the conveyor 24 and a labeling station, and means for applying sleeve labels to the containers.

As set forth in FIG. 3, the labeling machine 20 includes a main support framework in the general form of a rectangular parallelopiped on which the exterior housing 21 is supported. In general the interior support frame is characterized by a pair of vertical side frame networks which are in parallel spaced relation at the opposite sides of the labeling machine and are suitably interconnected by horizontal brace members, not illustrated in FIG. 3. Each of the side frame networks, as shown in FIG. 3, comprises a vertical back leg member 30 paralleled by a shorter intermediate leg member 31 and a front leg member 32, with the several leg members 30–32 being provided with adjustable ground engaging foot pads 33 (see FIG. 1). The leg members 30, 31 are paralleled by a front corner frame member 34 and a vertical intermediate frame member 35; the corner member 34 being aligned with the front leg member 32 and the intermediate frame member 35 being disposed substantially in alignment with the intermediate leg member 31. Suitable horizontal frame members 36–39 extend between the several vertical members 30–35 and an angularly disposed brace member 40 extends between horizontal member 39 and the intermediate vertical member 35 to complete the side frame formation. It will be understood that the above noted frame members preferably are rigid structural angle or channel iron appropriately interwelded at their respective junctions to provide a rigid support structure on which the external housing or cover 21 is mounted, as shown in FIG. 1. As previously mentioned the two side frames, as illustrated in FIG. 3, are appropriately interconnected by transverse horizontal frame members (not shown) to complete the framework formation.

As noted above, the machine 20 is designed to be placed alongside the user's production line conveyor which in this instance, comprises a belt conveyor 24 extending laterally across the frontal portions of the machine in the frame spacing generally bounded by the inset intermediate vertical members 35 and the aligned front leg and front corner members as indicated in FIG. 3. To that end the housing 21 (see FIG. 1) is provided with appropriate openings 41 in its side wall panels for passage of the conveyor means and containers supported thereon. In order to support a pair of front access doors 42, 42 (see FIG. 1), the interior framework of the label machine also includes a pair of parallel spaced, vertically disposed channel iron sections 43 depending from the horizontal cross frame members 37 and interjoined between the lower ends thereof by horizontal angle iron brace 44 (see FIG. 5). The depending frame structure so provided parallels the intermediate frame members 35 to provide an interior passageway, aligned with the cabinet openings 41, for the passage of the conveyor and containers. While there are additional support frame members, as will be mentioned from time to time in the ensuing description of particular mechanisms of machine 20, it will be understood that the particulars of the supporting framework and housing of the machine 20 are of no special moment to the present invention other than to provide suitable structure and means for supporting the several mechanisms involved in its operational combination. Thus, the current description will not be burdened further with a more specific description of the support framework and cabinet housing except as may hereinafter occur with the description of specific mechanism or means.

As seen in FIG. 3, located and supported substantially opposite the conveyor belt 24 and in horizontal parallelism therewith is a horizontal labeling station 45 which is located substantially centrally of the machine's interior and generally opposite the two access doors 42, 42 on the frontal wall or panel of the machine (see FIG. 1). It is to this support table that the unlabeled bottles or containers are transferred from the conveyor means and from which labeled containers are removed for further processing. In order to accomplish such container transfer operations, suitable transfer means are provided as particularly illustrated in FIG. 3 of the drawings.

With specific reference at this junction to FIG. 5, it will be recognized that, in addition to the interior support framework as heretofore described, the machine 20 also includes a pair of vertically disposed, parallel spaced interior support plates or walls 46 and 47 which extend generally transversely from front to back of the machine, above and between the horizontal frame members 37, between which the label feed means 23 (see FIG. 1) is mounted along with the associated operational means of the machine; including means for transferring containers to and from the labeling station, means for detaching individual labels from the feed supply and applying the same to the containers, and attendant control devices and the means associated therewith.

Reverting to FIG. 3, a loader means for moving containers on and off of the labeling station platform 45 comprises a vertically disposed loader arm 50 and an angularly disposed unloader arm 51 lying substantially on a central vertical plane of the machine and depending from an overdisposed carriage assembly 52, guided on vertically spaced horizontal upper and lower guide rails 53, 54 which are supported on the righthand support plate 47 (see FIG. 5). The carriage assembly 52 in fact comprises two sub-carriages: a loader carriage associated with the loader arm 50 and an unloader carriage associated with the unloader arm 51 which are adjustably interconnected for variation of the spacing between the two arms 50 and 51 to accommodate different size containers.

The loader arm 50, as best shown in FIG. 3, comprises a rigid vertical arm member, preferably of lightweight metal such as aluminum, bolted or otherwise fixed at its upper end to a mounting arm 55, depending from the outer end of a horizontal cross arm member (not shown) extending at right angles to the outer end of a slidable loader carriage block 56 having a longitudinal cylindrical bore fitted with appropriate bearings for sliding movement along the lower guide rail 54. Carriage block 56 further is provided with a laterally extending adjustment block 57 for purposes which will appear presently. The lower end of the loader arm 50 is fitted with a suitable container engaging pad and stop means 58, lying transversely of its longitudinal axis and designed to engage the lower exterior of a container to effectively push the same from the conveyor belt onto the labeling station table 45 in response to appropriate movement of the carriage assembly 52.

Projecting upwardly from the carriage block 56 and intermediate the ends thereof is a vertically disposed actuator arm 59 having bearing means near its outer end for sliding support on guide rail 53. Arm 59 also has a trip plate 60 mounted across its uppermost end in position to engage a pair of side-by-side sections 61*a* and 61*b* of an interferingly disposed twin microswitch assembly 61 in response to movement of loader carriage 52 along the guide rails 53 and 54. Actuator arm 59 is also coupled to one end of a pneumatic piston and cylinder assembly 62 arranged so that extension of the piston therein serves to translate the carriage assembly 52 toward the front of the machine while reverse actuation of the piston retracts the same toward the rear of the machine, thus bringing about the desired translating activities of the loader arms relative to the labeling station 45. Suitable spring loaded bumper assemblies 63 and 64 are disposed on opposite sides of the actuator arm 59 to brake the translating movement thereof as effectuated by operation of the piston and cylinder assembly 62.

The unloader arm 51 is secured to angle downwardly from mounting plate 66 depending from a horizontally disposed cross arm (not shown) extending at right angles from an unloader carriage block 67, constructed with a cylindrical interior and appropriate bearing means for sliding movement along the lower guide rail 54. Carriage block 67 is further fitted with an upwardly extending arm 68 affixed to its inner end and provided with a suitable bearing block 69 for sliding movement along the upper guide rail 53. A switch striker plate 70 extends from the upper bearing block 69 to engage a pair of spaced microswitches 71 and 72, electrically associated with the label applying functions, as will be described in greater detail hereinafter. As previously mentioned the unloader arm 51 depends angularly from the carriage assembly 52 in alignment with the loader arm 50, and carries a container engaging pad assembly 73, at its lower end for engaging containers on the labeling table 45.

Carriage block 67 also is equipped with a laterally extending adjustment block 74 aligned with the corresponding adjuster block 57 on the loader carriage block 56 while a suitable adjustment bolt and spring assembly 75 extends through appropriate openings in such two blocks to interjoin the same and adjustably space the two carriage blocks 56 and 67 on the guide rail 54 to accommodate different size containers. The spring means also permits limited relative movement between the loader and unloader blocks at the start and end of the loading and unloading strokes for the carriage assembly, whereby to positively grip and release a container to the conveyor 24. To this latter end, the unloader carriage arm 68 carries a projection plate (not shown) which engages the bumper assembly 64, thereby stopping the unloader carriage while the loader carriage continues to move across the conveyor to release a container. Similar but reverse relative movement releases the container at the loading station.

From the foregoing description it will be understood that in response to appropriate actuation of the pneumatic cylinder and piston assembly 62, the loader and unloader arms are simultaneously moved relative to the conveyor belt and labeling station, i.e., from front to back and vice versa of the machine, thereby to load and unload one container at a time onto and off of the labeling station 45.

Referring now to FIG. 4 of the drawings, the means for applying labels to the containers is illustrated as comprising the label supply means 23, guide horn means 76 for opening and forming the collapsed tubular label web, fed from supply means 23; cooperative horn clamp means 77, periodically operable to arrest passage of the opened end of the label web over the guide horn 76 and label gripper means 78, operable to detach single labels from the supply web and apply the same to the exterior of an unlabeled container 25 at the labeling station 45.

The label supply means 23, as shown in FIG. 4, comprises a supply drum 80 having a central cylindrical core 81 and axially projecting stub axles 82 at the opposite ends thereof which are supported in bearing blocks 83 secured to the vertical support plates 46 and 47 (see FIG. 5). The drum 80, of course, is designed to carry a cylindrical roll or web 85 of collapsed tubular labels made of flexible plastic film, as hereinabove discussed, which is trained over a series of horizontal guide rollers to the guide horn 76. Typically, as shown in FIG. 4, the free end of the label supply web 85 is trained from the drum 80 beneath and around a tensioning roller 86 mounted between the outer ends of a pair of pivotal support arms 87 carried on intermediate pivot axles 88 supported on support plates 46 and 47. Arms 87 are rigidly cross-connected at one end by brace 89, while the opposite ends thereof carry the tensioning roller 86 and gravitate downwardly against the train of the label supply web 85, responding to the unwinding movements of the drum so as to maintain a workable tension on the supply web. From the tensioning roller 86 the label supply is trained upwardly and over a pair of horizontally spaced and coplanar guide rollers 90, 90, located immediately adjacent to and beneath an adjustably positioned scanning-type photo cell 91 capable of being selectively positioned on bi-axial adjustment shafts 92 and 93 at selected locations between the two guide rollers 90 so as to be spotted or positioned at any desired location along the train of the label web extending between the guide rollers 90, 90. The photo cell means is used in detecting opaque spots or areas, printed on web 85 whereby to control operation of label machine as will be described hereinafter. From the second guide roller means 90, the label supply 85 is trained vertically downwardly over the guide horn means 76, passing between the latter and a pair of horizontally spaced support rollers 95 and 96, the latter of which is carried by and between a pair of pivotal support arms 98, 98 supported on the vertical support plates 46 and 47 by pivot means 99. Movement of the roller 96 to the dotted line position thereof illustrated in FIG. 4 permits loading of the tubular label over the guide horn means 76. When the movable support roller 96 is lowered to operating position, illustrated in FIG. 4, the same cooperates with the secondary support roller 95 to support the guide horn means 76 therebetween with a single film layer of the tubular supply 85 passing between the support rollers 95, 96 and the guide horn as will be amplified in greater detail presently.

In order to maintain proper tension on the label supply web and to prevent overrunning of the reel 80, the latter is equipped with brake means 100 comprising a spring biased brake arm 101 supported on pivot means 102 near its upper end and carrying a brake shoe 103 intermediate its end to engage the periphery of the drum core 81. Spring means 104 normally biases the arm 101 and its brake shoe away from the drum core to effect a normal non-braking condition therebetween. The lower end of the arm 101 is affixed to a horizontally extending lever arm 105 which extends beneath the tensioning roller 86 and its supporting arm system. Thus, when the tensioning roller support arms 87 move downwardly in response to a loose, non-tensioned condition of the label supply web, lever arm 105 gravitates downwardly therewith opposing the tension spring 104, to apply the brake shoe 103 to the brake drum core 81, braking the drum and re-tensioning the supply web.

As noted above, supply web 85 is trained over the guide horn 76 which thereby serves to open the web tube to a shape generally conforming to the peripheral contour of a container to be labeled. The particulars of the operation and structural aspects of the guide horn will be dwelt on presently, as set forth in FIGS. 7–9 of the drawings, but for the moment attention will be directed to the structural and functional operations of the horn clamp means 77 and the associated label gripper means 78.

With particular reference to FIGS. 4 and 5 of the drawings, the horn clamp means 77 are mounted to operate in horizontal reciprocating directions on opposite sides of the guide horn 76 so as to positively clamp individual wall thickness of the tubular supply web between the cooperating clamp members of the horn clamp means 77 and the guide horn, thereby arresting downward motion of the label web while the label gripper means 78 serve to separate or detach an individual label from the clamped end of the supply web. To that end, the horn clamp means 77 comprises a pair of generally U-shaped clamp members 110 and 111 which are horizontally aligned on opposite sides of the guide horn 76 and symmetrically disposed with respect to a central plane thereof. Clamp member 110 is stationarily supported on a suitable cross frame member 112 extending horizontally between the two support plates 46 and 47 and carries resilient pad members 113 at the outer ends of its spaced arm portions 114 (see FIG. 5).

In contrast to the stationary clamp member 110, the second clamp member 111 of the horn clamp assembly is movably mounted on a pair of support rods 115 for reciprocating movement toward and away from the horn clamp in response to activation of a centrally disposed pneumatic piston and cylinder assembly 116. Like clamp 110 the movable clamp 111 carries resilient pads 117 at the outer ends of its arm portions 118 in order to positively grip and hold the flexible label material against the side wall of the guide horn. The entire movable clamp 111 is supported on a second horizontal support bar 119 paralleling the corresponding support 112 associated with the stationary clamp 110.

It will be appreciated that the horn clamp assembly 77 is adapted to be periodically actuated in accordance to a predetermined operational sequence of the labeling mechanism as will be described in greater particular hereinafter. Basically, however, inasmuch as the guide horn 76 is supported freely by and between the two rollers 95 and 96, the same is free to rock or move in a floating manner between the clamp members 110 and 111 whereby activation of the movable clamp member 111 of the assembly 77 effectively engages the pads 113 and 117 of the two clamp members 110 and 111, respectively, tightly against the sides of the guide horn to bring about a desired clamping of the separated layers of the label supply web therebetween.

To facilitate a better understanding of the features and functions of the guide horn, specific reference is now made to FIGS. 4, 5, and 7–9 of the drawings. As best seen in FIGS. 7–9 for example, it will be noted that the guide horn 76 is made up of a central rigid plate member 120 of light aluminum alloy or the like, made with a generally trapezoidal shaped upper end portion 121 flaring outwardly from a central rectangular body portion 122 thereof. Substantially at the junction between the upper end portion 121 and the body portion 122, are a pair of rollers 123, 123, rotatably supported at their ends by roller bracket members 124 fixed to the plate member 120, so that the rollers 123 are disposed on opposite sides of the plate member. As shown in FIGS. 4 and 8 in particular, the rollers 123 are underengaged by the support rollers 95 and 96 associated with the supply web feed system heretofor described. Thus the guide horn rides loosely between the bite of the two rollers 95 and 96 and is supported thereon by the interengagement of such supporting rollers with the side mounted rollers 123 on the guide horn. It will be appreciated that the upper end portion 121 of the guide horn body is flared outwardly to conform substantially with the internal lateral dimension of the tubular supply web and that the same is suitably radiused at its upper corners to avoid tearing or ripping of the tubular material. This upper portion of the guide horn opens and guides the web 85 downwardly over the guide horn, with the floating mounting arrangement for the guide horn serving to maintain the latter in alignment with the flow line of the supply web in operation.

Again as best shown in FIG. 7 of the drawings, the guide horn 76 is further equipped near its lower end with angularly shaped, outwardly flaring skirt members 125, 125 separated by the body portion 122 and a pair of substantially T-shaped mounting blocks 126, 126, one adjacent each end of the skirt members. As illustrated in FIGS. 8 and 9, the T-shaped mounting blocks 126 are connected by bolt means 127 to the lower end of the body portion 122, while the skirt members 125 are affixed to the mounting blocks 126 by plural screw means 128. It also will be noted, with particular regard to FIGS. 7 and 8, that the skirt members 125 each comprise an angularly disposed wall portion 129 and a vertically disposed side wall portion 130; the latter wall portions lying substantially parallel on opposite sides of the main body member 120 in final assembly. It is the skirt wall portions 130 of the guide horn against which the guide horn clamp members are pressed during their web clamping operation. In that regard, the positioning of the mounting members 126 inwardly of the ends of the guide horn is such as to align the same opposite the separated arm portions 114 and 118 of the two horn clamps 110 and 111. Thus activiation of the horn clamp assembly in a clamping direction, squeezes the tubular label walls against the skirt wall portions 130 of the guide horn, with the opposing clamp arms 114 and 118 aligning opposite the intervening mounting blocks 126. This provides a good support for the clamp action and permits compression of the clamp engaging pads 113 and 117 to tightly grip the label material as desired.

Turning now to the features of the label gripper means specific reference is made to FIGS. 5, 10 and 11 of the drawings from which it will be understood that there are two gripper assemblies 78, one located opposite each open end of the guide horn 76; the operating axis of the gripper finger assemblies 78 being at right angles to that of the guide horn clamps 76. Inasmuch as the two assemblies 78 are identical, a description of one will suffice for both with corresponding parts bearing like numbers in both assemblies. Specifically, as best shown in FIG. 10, each assembly 78 comprises a stationary gripper finger 135 and an underdisposed movable gripper finger 136. Finger 135 is carried at the upper end of a vertically upright support post 137 fixed at its lower end to a horizontal elevator arm 138. The stationary or fixed gripper finger 135 is formed with a curvilinear gripper surface 139 covered by a resilient gripper cushion or pad 140 (see FIGS. 5 and 11).

The movable gripper finger 136 has a generally rectangular shaped body 141 formed with an upwardly extending finger portion 142 which is curvilinear in plan profile to match that of the gripping surface 139 of the stationary finger 135. It will be understood that the movable finger 136 is movable relative to and beneath the stationary finger 135 with finger portion 142 thereof lying opposite the gripper pad 140. To that end the finger 136 is connected to the movable piston of an associated pneumatic piston and cylinder assembly 143 supported on the vertical support post 137. Both gripper assemblies 78 are located relative to the guide horn so that the normal open gap between the stationary and movable finger portions 135 and 142 straddles the label portions 144 extending across the ends of the guide horn; fingers 142 extending upwardly between the skirt portions 130, 130 thereof (see FIGS. 5 and 11). In essence, the movable fingers 142 are located inwardly of the open ends of the guide horn while the stationary fingers 135 thereof are positioned outwardly of such ends (see FIG. 11).

It will be appreciated that when the pneumatic cylinder assemblies are appropriately activated, the movable finger portions 142 serve to pull the label web portions 144 outwardly to the stationary finger members 135, gripping the same tightly against the gripping pads 140 thereon. Thus the label material is firmly gripped by assemblies 78 at opposite ends of the guide horn. The curvilinear configuration of the gripper fingers and the lateral spreading effected by the spacing of the skirt wall portions 130, 130 of the guide horn effectively open the label web to substantially conform with the container contour. It will be recognized in this regard that the shaping of the opened end of tubular label may be altered as desired in accordance with the configuration of the gripper fingers and the cooperating guide horn skirt wall portions 130 so as to accommodate cylindrical, rectangular, square or other shape containers. In the particular instances illustrated, the preferred container shape is generally cylindrical (see FIG. 4) or rectangular (see FIG. 5) in cross section. In each instance a guide horn and gripper assemblies configured in accordance with the present disclosures are capable of opening the label tube sufficiently to permit the application thereof over either the rectangular shaped or cylindrical shaped containers illustrated.

As mentioned previously, each of the assemblies 78 is carried on one of a pair of horizontal elevator arms 138 which are disposed in parallel relation and extend rearwardly from the two assemblies 78 past a vertical mounting plate 150 located adjacent the rearward side of the machine (see FIG. 5). Means for activating the elevator arms 138, 138 are best set forth in FIG. 6 of the drawings, as will now be described.

Generally speaking the arrangement of the elevator means is such as to move the horizontal elevator arms 138, 138 and gripper assemblies 78 mounted thereon, vertically between an upper position generally opposite the guide horn, as seen in FIG. 4, and a lowered position beneath the level of the labeling station platform 45, as shown in the bottom portion of FIG. 10. This activity of the gripper fingers serves to downfeed the web 85 and effectively detach single sleeve labels therefrom, in cooperation with the horn clamp assemblies, as above described, pulling the web downwardly over the exterior of the container for deposit in a designated position, all as schematically set forth in FIG. 10.

In order to accomplish the foregoing functioning, the two elevator arms 138, 138 are affixed at their inner ends (i.e. remotely of the ends thereof which support the gripper finger assemblies 78, 78), to a horizontal cross head 151 disposed rearwardly of the vertical mounting plate 150 (see FIGS. 5 and 6). The cross head 151 carries laterally spaced bearing blocks 152 and 153 having axial openings therein for the passage of associated guide rails 154 and 155 aligned in vertical spaced parallelism on the rearward side of the mounting plate 150. Cross head 151 is also coupled substantially centrally thereof to the lower end of a pneumatic cylinder and piston assembly 156 mounted on the rearward face of the mounting plate 150 and arranged so that activation of the cylinder assembly serves to move the cross head along the guide rails 154 and 155. This effects corresponding raising and lowering of the elevator arms and gripper assemblies 78. Twin bumper assemblies 157 are mounted over the elevator arms to arrest the same at the upper limits of their elevating stroke, while a single centrally disposed bumper assembly 158 is located beneath the cross head for engaging and limiting the downward stroke thereof.

At the opposite ends of the cross head 151 are mounted a pair of switch shoes 160 and 161 having sloping cam edges along the operationally upper and lower ends thereof. These shoes move with the cross head along its vertical reciprocating path in accordance with the activation of the piston and cylinder assembly 156. It will be noted that in the path of movement for the righthand shoe 160, as viewed in FIG. 6, are a pair of microswitch assemblies 162 and 163, while a second pair of microswitch assemblies 164 and 165 are located in the path of movement for the lefthand switch shoe 161. Such switch assemblies 162–165 are suitably supported on the mounting plate 150 by laterally extending bracket arms 166, 166 which extend horizontally outwardly of the mounting plate 150. Vertical mounting plates 167 and 168 carry the diagonally opposite assemblies 162–165 in fixed positions while adjustable mounting plates 169 and 170, respectively, carry the switch assemblies 163 and 164 to permit their vertical adjustment. Adjustment of the vertical positioning for switch assemblies 163 and 164 selectively determines their operational cycle and timing. It will be understood that as the cross head 151 moves past each of the switch assemblies 162–165, the operating arms thereof are successively engaged to activate associated control circuits, as will be amplified in greater particularity hereinafter.

In order to synchronize the several hereinabove described functions of the labeling machine, particularly the application of individual band labels to containers at the labeling station, with the infeed and discharge of containers to and from such station, means are provided adjacent the conveyor means 24 for insuring a ready supply of unlabeled containers and the orderly discharge of labeled containers from the machine.

To that end specific reference is made at this juncture to FIGS. 3 and 5 of the drawings. As shown in FIG. 5, the conveyor belt 24 is laterally bordered by parallel pairs of guide rails 175, 175 and 176, 176 which respectively engage and guide the containers on the infeed side of the loader means, comprising the heretofore described arms 50 and 51, and on the discharge side thereof. It will be noted that a gap is provided between the aligned rails 175 and 176 on opposite sides of the conveyor belt 24. This accommodates the transverse movement of the loader means across the conveyor belt and affords movement of containers through the gap between the guide rails 175 and 176 bordering the inboard lateral edge of the conveyor belt. The corresponding gap between the outboard guide rail means 175 and 176 permits the loader arm 50 to clear the belt conveyor in its extended position. In order to prevent the supply of unlabeled containers 25 from blocking the conveyor opposite the labeling station while a container is being labeled at the labeling station, the container engaging pad means 58 carried by the loader arm 50, is configured to provide a stop barrier portion 177 (see FIG. 5). Upon loading movement of the arm 50 toward the labeling station, the stop barrier is positioned transversely across the conveyor means 24 substantially at the terminal end of the parallel guide rails 175, 175, thereby blocking the upstream supply of unlabeled containers. Thus on the infeed stroke of the loader arm 50, a container opposite pad means 58 is translated from the conveyor belt to the labeling platform, while the barrier portion 177 associated therewith automatically extends across the continuously moving conveyor belt. This action prevents the infeed of additional containers to a position opposite the labeling station until such time as the loader arm 50 returns to its outboard position, illustrated in FIG. 5. It will be recognized that as the barrier 177 retracts from across the conveyor means with the return movement of a labeled container to the conveyor, the labeled container is pushed away from the loader arm by an incoming unlabeled container.

In addition to the barrier portion 177 above described, an intermittingly operated gate assembly 180 is provided adjacent the discharge end of the labeling machine. As best shown in FIG. 5, this assembly comprises a generally quadrant shaped base plate 181 having a vertical stop wall 182 extending upwardly at right angles along one edge of the base plate 181. A pivot boss 183 and pivot 184 are provided at one corner of plate 181 for pivotal movement of the latter about a vertical axis. Suitable pneumatic piston and cylinder means 185 is pivotally coupled to the base plate 181 and anchored to adjustable gate bracket 186 which has sliding connection with the undersupporting frame member 44 whereby to position the gate wall 182 at selected adjusted positions along the conveyor belt 24. Appropriate activation of the pneumatic piston and cylinder assembly 185 serves to swing the gate member across or away from the conveyor to correspondingly block and release labeled containers.

Gate bracket 186 further carries a suitable guide rail bracket 187 for supporting the adjacent guide rail 176 parallel to the conveyor belt while a photo cell assembly 188 is supported on bracket 186 by a photo cell bracket 189 adjustably positionable longitudinally of the conveyor belt.

In addition to carrying the photo cell assembly 188, bracket 189 also supports a hoop shaped reflector bracket 190 which extends over the conveyor belt and downwardly on the opposite side thereof for supporting a reflector 191 for light reflective cooperation with the photo cell. Thus the presence of a labeled container against the gate wall 182 is effective to preclude or interrupt the light path to the photo cell circuit of the assembly 188.

An additional section of photo cell assembly 188 (not shown) is provided on the incoming side of the conveyor in order to detect the presence of unlabeled containers on the conveyor belt prior to and in advance of the loader means, whereby to insure a supply of unlabeled containers to the machine. While such additional photo cell circuit is not illustrated, in FIG. 5 for instance, the electrical arrangement of the controls for the machine is such as to require the interruption of the infeed photo electric cell circuit, as a prerequisite to operation of the loader means. In addition satisfaction of the circuit associated with the photo cell assembly 188 by the presence of a labeled container against the gate means 180 is required for operation of the loader means.

Having described the various mechanisms and assemblies associated with the herein disclosed labeling machine 20, the use and operation thereof will best be understood in conjunction with the schematic control circuit diagram of FIGS. 12 and 12A.

The schematic diagram of FIGS. 12 and 12A is illustrative of a typical control circuitry for the functioning of the labeling machine 20 as hereinabove described. As noted the control circuit is supplied from a 120 volt, 60 cycle AC power source and includes line conductors 195, 196, a main line power switch 197 with protective line fuse 198 and "Ready" light 199.

Closing of the line switch 197 provides energy to a master control circuit indicated generally at 200 in FIG. 12, which incorporates one or more door interlock switches 201, 201, closed by securing the access doors 42, 42 in closed position over the front panel of machine 20. Circuit 200 also includes a normally closed master "Stop" switch 202 and a normally open master "Start" switch 203 and related "Ready" light 203*a* in circuit with a master control relay 204 having related contact sets 205 and 206. Depression of the master "Start" switch 203 energizes master control relay 204, closing contacts set 205 and thereby energizing an air supply solenoid 207 of a solenoid operated master air control valve for supplying compressed air to the several heretofore described pneumatic cylinder and piston assemblies 62, 116, 143, 156 and 185.

Closing the master "Start" switch 203 also closes its second set of relay contacts 206 to supply enabling energy to a label cycle circuit comprising a normally closed "Stop" switch 208 and normally open "Start" switch 209 having a "Ready" light 209*a*. With the master relay contacts 206 closed, depression of the cycle "Start" switch 209 serves to energize a cycle relay 210 and its associated contact sets 211 and 212; the latter controlling energization of individual control circuits, as will appear presently.

Energization of the master relay 204 and its second set of contacts 206 also supplies energy to the photo cell assembly 188, which as previously noted, has two switching sections labeled 188*a* and 188*b* in FIG. 12. These switch sections are located along the conveyor belt 24; switch section 188*a* operating with the stop gate 180 and reflector 91 to detect the presence of a labeled bottle against the stop gate while switch section 188*b* and reflector 191*a* are located on the infeed side of the loader means to indicate the presence of containers on the infeeding side of the loader. When both of these switch sections are satisfied by the presence of containers, associated contacts 213 are closed to energize a loader control circuit.

The loader control circuit includes the normally open photo cell operated contacts 213, as above noted, and the microswitch 165 which is normally closed, but is held open in the fully lowered condition of the elevator by the cam shoe 161 (see FIG. 6). The loader control circuit also includes normally open microswitch 162 which is held closed in the fully raised position of the elevator by the cam shoe 160. Closing switch 162 energizes an associated loader control relay 214 to establish circuit through relay contacts 215 and a loader solenoid 216 which operates the pneumatic piston and cylinder assembly 62 of the loader assembly to move the carriage assembly 52 in a loading direction. Conversely deenergization of solenoid 216 causes the double acting piston and cylinder assembly 62 to move the loader to its unloaded position. Since the photo cell contacts 213 enable this loader circuit, the presence of containers both prior to the loader station and against the gate means 180 is prerequisite to the initiation of the container loading function.

The elevator control circuit is basically controlled by the microswitch assemblies 71 and 72 which are engaged by the switch striker plate 70 carried by the loader carriage assembly 52. Thus the control circuit therefor includes the normally closed microswitch 71 which is held open at the unloaded position of the loader assembly, but is in closed position during the loading cycle. Microswitch 72, on the other hand, is held closed by the switch plate 70 when the loader assembly is in fully loaded position and is open during the unloading cycle. When the loader is in its loaded position over labeling station 45, both switches 71 and 72 are closed whereby an elevator and gate control relay 217 is energized, closing its related contacts 218 to energize an elevator control solenoid 219 and a second gate control solenoid 220. This activates the respectively related pneumatic piston and cylinder assemblies 156 and 185.

When the two solenoid coils 219 and 220 are energized, the stop gate 180 is swung to its closed position across the conveyor 24 and the elevator is lowered. Deenergization of solenoids 219 and 220 raises the elevator and opens the stop gate by reverse action of their associated double acting piston and cylinder assemblies 156 and 185.

As set out in FIG. 12A, the control circuit for the gripper assemblies 78 includes microswitch 163 which is momentarily held open by downward movement of the elevator as the cam shoe or plate 160 moves into engagement with the actuating arm of the adjustable switch assembly 163 (see FIG. 6). Switch 163 is in circuit with one switch section 61*a* of the twin microswitch assembly 61; the same being normally open, but momentarily closed by the trip plate 60 as the loader assembly moves in a loading direction. Closure of switch 61*a*serves to energize a related finger control relay 221, closing its relay contacts 222 and thereby energizing a finger gripper solenoid 223. This actuates the pneumatic cylinder and piston assemblies 143 to close the gripper finger assemblies 78 about the skirt of an open label mounted about the guide horn 76. As the shoe or trip plate 60 moves past switch 61, the latter opens, but relay 221 and solenoid 223 remain energized, holding the gripper fingers closed. When switch 163 is opened near the bottom of the elevator stroke, the gripper fingers open and release the label.

It will be recalled that a scanning type photo cell assembly 91 is disposed over the label web so as to detect the presence of an opaque marking printed thereon. Energization of the photo cell assembly 91 is effected by the closure of the adjustable microswitch 164 in response to downward movement of the elevator and the interengagement of such switch assembly with the switch shoe 161 on the elevator carriage. As the shoe 161 moves past the switch assembly 164 the same is momentarily opened and closed to energize the photo cell assembly 91. When cell assembly 91 is appropriately energized it serves to open its normally closed switch contacts 225 when an opaque spot or area on the label web 85 is detected, thereby deenergizing the horn clamp circuit and causing the horn clamp to clamp the label web against the guide horn.

In circuit with the photo cell contacts 225 is a secondary switch section **61*b* associated with the cam operated twin microswitch assembly 61. Switch 61*b* is normally open, but is momentarily closed by movement of the cam shoe 60 past the switch assembly 61 in response to the movement of the loader assembly in a loading direction (see FIG. 3). With switch section 61*b* contacts and photo cell contacts 225 closed, energization of the horn clamp solenoid control relay 227 takes place, closing related relay contacts 228 and energizing an associated horn clamp solenoid 229. When this occurs the horn clamp assembly 77 moves away from the skirt walls of the guide horn, releasing the label web. As soon as shoe 60 passes switch 61*b* the same opens, but the horn clamp relay 227 remains energized until such time as the photo cell 91 detects the next spot on the label web thereby opening its contacts 225 and deenergizing solenoid 229 to again close the horn clamps. Meanwhile the opened label held by the gripper fingers has been moved past the guide horn by the lowering movement of the elevator and gripper assemblies 78. When the horn clamp again closes, downward movement of the label web is stopped, but the opened label held in the gripper fingers continues downward and is thereby detached from the web 85** at its perforated connection. The detached label then may be deposited about the periphery of the container.

In general the described circuit components and related assemblies operate in the following manner: When the "Start" switch or button 203 is depressed, the solenoid operated air valve 207 opens to supply compressed air to the several pneumatic cylinder and piston assemblies, bringing the machine to a "Start" condition in which the elevator cross head is fully raised in an "Up" position, the loader assembly is fully out in straddling relationship with the conveyor 24, ready for loading, the stop gate assembly 180 is extended across the conveyor 24, the gripper finger assemblies 78 are in "Open" condition adjacent the guide horn and the horn clamp assembly 77 is clamped, holding the label web 85 against the skirt walls of the guide horn. When the "Cycle Start" switch 209 is closed and the photo cell switch sections **188*a* and 188*b* are satisfied by the presence of containers against the gate 180 and at the input side of the loader, the machine will start its labeling cycle. As the loader assembly moves toward the labeling station, loader arm 50 moves relatively toward unloader arm 51 to grip the loaded container, due to the adjustable spring loaded connections (57, 74, 75) between the carriage blocks 52 and 67. Conversely the container is released at the labeling station by reversal of this relative movement. As the loader nears the labeling station, the loader arm barrier 177 blocks the next incoming container on conveyor 24. Microswitch 61*a* and its associated relay contacts 222 are closed to actuate the gripper finger assemblies 78, causing the same to grasp the lower margin of a label positioned over the guide horn 76. At the same time switch section 61*b* closes, energizing the horn clamp solenoid 229 and causing the horn clamp assembly 77 to release the label web. When the loader assembly completes its load stroke, positioning the container on the labeling station 45, it closes switch 72, causing the elevator to initiate downward movement, thereby pulling the label engaged by the gripper assemblies 78 downwardly past the guide horn. As the elevator assembly moves down, switch 164 is depressed by the cam shoe 161, which energizes the scanning photo switch assembly 91 permitting the same to recognize or register with a mark on the label web 85. When such a mark is perceived by the scanning photo cell assembly 91, its contacts 225 open, deenergizing horn clamp solenoid 229 to cause the horn clamp to tightly grip the label web against the skirt walls of the guide horn. This holds the label web against the guide horn while the downwardly moving label in the grip of the finger assemblies 78** is detached at or along its perforated connection with the label web.

As the detached label is pulled downwardly over the container, the elevator shoe 160 engages the adjustable switch assembly 163, which deactivates the gripper control circuit, causing the gripper fingers to open and release the applied label. As the opened gripper fingers move downwardly with the elevator they slip out from between the container and the label, depositing the same in desired position about the container. When the elevator reaches the bottom of its down stroke, switch shoe 161 thereon engages and opens switch 165, deenergizing the loader control circuit and causing the piston and cylinder assembly 62 to reverse and thereby initiate the unloading cycle. When the loader is fully out, it hits switch 71, deenergizing the elevator and gate control circuits. This closes the gate across the conveyor as the loader carriage block 52 moves away from the unloader carriage block 67, thereby releasing the labeled container which is then moved against the closed gate by the conveyor 24. As the labeled container leaves the loader, an unlabeled container is moved into loading position between arms 50 and 51. With the previously labeled container satisfying the first section. **188*a* of photo cell assembly 188 at the gate and an unlabeled container satisfying the second section 188*b* of the photo cell assembly 188** on the infeed side of the loader, the machine restarts its labeling cycle.

Depression of the "Cycle Stop" switch 208 will leave the machine in condition for a restart by merely depressing the "Cycle Start" switch 209. Depression of the master "Stop" switch 202 will open the air valve controlled by solenoid 207, dumping air from all operating piston and cylinder assemblies, in which event the master and cycle "Start" buttons must again be depressed to start an operating cycle.

From the foregoing brief description it will be recognized and understood that so long as there is supply of unlabeled containers prior to the loading station and a labeled container against the stop gate assembly 180, machine 20 is conditioned for automatic cycling operation. During this procedure, label web 85 is intermittingly pulled downwardly over the guide horn 76 by means of the gripper finger assemblies 78 and is periodically arrested by engagement of the horn clamp assemblies 77 with the skirt walls of the guide horn while the elevator assembly moves downwardly, whereby a label held by the gripper finger assemblies is detached from the lower end of the label web. Continued downward movement of the elevator assembly serves to pull the opened label sleeve over a container at the labeling station until the gripper finger assemblies 78 are opened, releasing the label about the exterior of the container as the gripper fingers move downwardly past the labeling station 45. This sequence of events is schematically shown in FIG. 10 of the drawings. Once a label has been applied to the container at station 45, the loader assembly moves in an unloading direction, depositing the labeled container on the moving conveyor 24, which thereupon moves the labeled container against the closed gate assembly 180. Upon movement of the loader arm 50 past the belt conveyor, the barrier means 177 carried thereby clears the conveyor belt, permitting an incoming unlabeled container to move into loading position between the loader and unloader arms for initiation of the next labeling cycle.

MODIFIED FORM

Inasmuch as the machine 20 heretofore described is adapted to handle containers of different sizes and shapes, an illustrative modification of container guide means, useful when handling cylindrical containers, as opposed to the generally rectangular shaped containers illustrated in FIG. 2, is shown in FIGS. 13 and 14 in the drawings. As there shown, the heretofore described guide rails 175, 175 on opposite sides of the conveyor belt 24 are supplemented by a secondary set of guide rails 230, 230 located at an elevated position above the conveyor. Rails 230, 230 are spaced generally in closer relation than the rails 175 for guiding cylindrical containers 231 having handle means 232 therebetween. With this arrangement, cylindrical containers 231 are aligned between the two sets of guide rails 175 and 230 on the incoming side of the loader means whereby to maintain the handle means 232 thereof between the upper guide rails 230, 230. Thus a sleeve label may be applied about the body of the cylindrical container so that the printed areas thereon are substantially at 90° to the alignment or axis of the handle means. Other modified arrangements of guide means for orienting containers as desired, are felt to be well within the skill of those familiar with this art as recognizable modifications or adjuncts to the hereinabove described preferred embodiment of this invention whereby to adapt the same to the handling of cylindrical or other shaped containers.

From the foregoing it is believed that those skilled in this art will readily recognize and appreciate the advanced techniques and concepts embodied in the current inventive combination and understand that while this invention has been described in association with an illustrated preferred embodiment, that the same is susceptible to variation and modification without departing from the spirit and scope thereof which is to be unlimited by the foregoing except as may appear in the following appended claims.

The embodiments of the invention in which an exclusive property or privilege is claimed are defined as follows:

1. Apparatus for automatically applying flexible band labels about the exterior of containers, wherein labels are supplied in the form of an elongated tubular web having individual band labels separably connected in end-to-end relation, comprising: a horizontal labeling station, reciprocating loader means for moving containers horizontally to and from said station including relatively moveable spaced arm means operable to positively grip and move a container to and from said station and to hold the same thereat in upright label receiving position; label supply means comprising means for storing a supply web of labels and means for guiding the outer end portion of said web into overdisposed alignment with a container at said station; label opening means suspended within said outer end portion in coaxial vertical alignment with a container at said station and comprising a planar body portion engagable with the interior walls of said web and formed to separate said walls substantially across the full lateral dimension of said web, and rigid spaced skirt means extending outwardly along opposite sides of said body portion and operable to engage the separated walls of said web in response to movement of the same thereover; said skirt means serving to open the outer end portion of said web so that said walls thereof are stretched externally thereover and in general alignment with the exterior periphery of an underdisposed container at said station; such open outer end portion including laterally spaced wall portions engaging said skirt means in spaced symmetry outwardly of the plane of said body portion and interjoined by spaced intervening end wall portions extending transversely across the opposite ends of said spaced skirt means; a pair of selectively operable clamp means mounted on opposite sides of said opening means for linear horizontal movement toward and away from said skirt means thereof, said clamp means cooperating with said skirt means to firmly clamp said laterally spaced wall portions therebetween; a pair of gripper means adjacent said opposite ends of said skirt means comprising cooperating pairs of relatively movable finger means, engagable with the inside and outside faces of said intervening end wall portions and linearly movable to positively grip the latter; elevator means supporting said gripper means and operable to periodically elevate and lower the same vertically between said opening means and said station whereby to position said finger means for gripping engagement with said end wall portions and to transfer an opened label gripped thereby from said opening means downwardly over the exterior of a container positioned at said labeling station; means for periodically operating said gripper means to sequentially grip a label at said opening means and to release the same about the exterior of a container at said station; the lowering movement of said gripper means and a label gripped thereby serving to advance the next succeeding label onto said opening means; and additional means for periodically operating said clamp means to clamp each opened label to said skirt means thereby to disrupt its separable connection with a preceding label being moved downwardly with said gripper means.

2. The invention of claim 1 and control means for operating said gripper means, elevator means and clamp means in response to loading operation of said loader means whereby to precondition unclamping operation of said clamping means and label gripping action and downward movement of said gripping means on the presence of a container at said labeling station.

3. The combination of claim 2 and additional control means operatively responsive to the detection of spaced indicia on and advancing movement of said web for controlling periodic clamping operation of said clamp means.

4. The combination of claim 1 wherein said opening means comprises operationally horizontal, parallel guide rollers rotatably mounted on opposite sides of said body portion for rotatably engaging the interior walls of said web, and parallel spaced support rollers mounted exteriorly of said web in undersupporting relation with said guide rollers whereby to suspend said opening means within said web.

5. The combination of claim 1 and rigid support means extending transversely between said spaced skirt means in confronting relation with said clamp means whereby to resist clamping pressures exerted on said skirt means by said clamp means.

6. The combination of claim 1 wherein said finger means are contoured and positioned to maintain the general opened configuration of a label removed from said opening means.

7. The combination of claim 1 wherein the containers have flexible walls, and the open contour of each label is slightly less than the circumference of a container to which it is to be applied whereby said finger means stretch the label tightly over the container's exterior.

8. The combination of claim 1 and means cooperating with said loader means for orienting a container at said station into label receiving alignment with said opening and gripper means.

9. The combination of claim 1, and means responsive to selected lowering movement of said elevator means for controlling label releasing operation of said gripper means thereby to deposit a label at selected positions within the vertical limits of a container at said station.

10. The combination of claim 1, and means for supplying unlabeled containers to said loader means and removing labeled containers therefrom, and control means responsive to the presence of unlabeled containers at the infeed side and labeled containers at the discharge side of said loader means for controlling container loading operation of said loader means.

* * * * *